(12) United States Patent
Matsumoto et al.

(10) Patent No.: US 8,217,773 B2
(45) Date of Patent: Jul. 10, 2012

(54) FIELD WATCH APPARATUS

(75) Inventors: Muneaki Matsumoto, Okazaki (JP); Taketo Harada, Obu (JP); Kunikazu Nakayama, Nagoya (JP)

(73) Assignee: Denso Corporation, Kariya (JP)

( * ) Notice: Subject to any disclaimer, the term of this patent is extended or adjusted under 35 U.S.C. 154(b) by 370 days.

(21) Appl. No.: 12/592,870

(22) Filed: Dec. 3, 2009

(65) Prior Publication Data

US 2010/0141414 A1    Jun. 10, 2010

(30) Foreign Application Priority Data

Dec. 4, 2008  (JP) ................... 2008-310108
Dec. 4, 2008  (JP) ................... 2008-310109

(51) Int. Cl.
*B60Q 1/00* (2006.01)
(52) U.S. Cl. ............ 340/435; 340/436; 340/438
(58) Field of Classification Search .......... 340/435
See application file for complete search history.

(56) References Cited

U.S. PATENT DOCUMENTS

| | | | |
|---|---|---|---|
| 2006/0077049 A1* | 4/2006 | Kato et al. | 340/435 |
| 2006/0290482 A1* | 12/2006 | Matsumoto et al. | 340/436 |
| 2007/0182527 A1* | 8/2007 | Traylor et al. | 340/435 |
| 2008/0122604 A1* | 5/2008 | Hattori et al. | 340/441 |
| 2010/0295670 A1 | 11/2010 | Sato et al. | |

FOREIGN PATENT DOCUMENTS

| | | |
|---|---|---|
| JP | 2000-131432 | 5/2000 |
| JP | 2000-177513 | 6/2000 |
| JP | 2005-012465 | 1/2005 |
| JP | 2005-045602 | 2/2005 |
| JP | 2005-241511 | 9/2005 |
| JP | 2005-346177 | 12/2005 |
| JP | 2008-182312 | 8/2008 |

OTHER PUBLICATIONS

Office Action dated Feb. 15, 2011 in the corresponding JP Application No. 2008-310108 with English translation.
Office action dated Feb. 15, 2011 in corresponding Japanese Application No. 2008-310109 with English translation.

* cited by examiner

*Primary Examiner* — George Bugg
*Assistant Examiner* — Kerri McNally
(74) *Attorney, Agent, or Firm* — Harness, Dickey & Pierce, PLC

(57) ABSTRACT

A field watch apparatus uses a storage unit to store detection data of a detected obstacle from an obstacle sensor that detects objects under control of a control unit, and the detection data accumulated in the storage unit over time is used to display a mark on a captured image that is captured by a camera and shown on a screen of a display unit. The mark size and other attributes of the mark in the image are controlled in a manner that enables a view to easily recognize an old mark from a new one, thereby providing an intuitive recognition of the obstacle movement in a certain direction in the captured image, when the mark is superposed in the captured image for multiple times based on the accumulated detection data in the storage unit.

15 Claims, 5 Drawing Sheets

FIELD WATCH APPARATUS

CROSS REFERENCE TO RELATED APPLICATION

The present application is based on and claims the benefit of priority of Japanese Patent Applications No. 2008-310108, filed on Dec. 4, 2008, and No. 2008-310109, filed on Dec. 4, 2008, the disclosures of which are incorporated herein by reference.

FIELD OF THE INVENTION

The present disclosure generally relates to a field watch apparatus that detects and displays an obstacle around a vehicle.

BACKGROUND INFORMATION

Conventionally, an obstacle detected by an apparatus was displayed, on a screen of the apparatus, as a captured image that captures a field around a vehicle, for notifying the user of the danger of the obstacle, for example.

Further, in recent years, the captured image of the obstacle in the near field has detection information superposed thereon when it is displayed on the screen. For example, as disclosed in a Japanese patent document JP-A-2005-45602, the detection information detected by an obstacle detector is translated into a symbolic icon, and the symbolic icon is superposed in the camera captured image of the near field for the display on a monitoring device.

However, the above technique of the obstacle detection has a problem that the user has difficulty in determining which way the obstacle is moving in the captured image. More practically, in the technique in the document JP-A-2005-45602, the detection information is displayed in a superposing manner on the detected obstacle in the captured image only as a symbolic icon that shows a detected distance of the obstacle and a position of the obstacle in a detection area of the detector. Therefore, the user has a hard time to understand whether, for example, the obstacle is moving away from the user's vehicle or is coming closer to the vehicle, thereby having difficulty in finding which way he or she should maneuver.

SUMMARY OF THE INVENTION

In view of the above and other problems, the present disclosure provides a field watch apparatus that enables the user to easily distinguish the moving direction of the obstacle in a near field of the vehicle, when the apparatus detects and displays the obstacle in the captured image of the near field on a display device or the like.

In an aspect of the present disclosure, the field watch apparatus includes: an image capture unit for capturing a field image around a vehicle: an obstacle detector for detecting an obstacle around the vehicle; a display unit for displaying the field image captured by the image capture unit; a data acquisition unit for continually acquiring obstacle data from the obstacle detector after an initial detection of the obstacle; a storage unit for accumulating the obstacle data continually acquired by the data acquisition unit; and a change unit for changing, in association with the obstacle data, an obstacle mark, which is superposed on the field image when the obstacle is detected by the obstacle detector. Further, the change unit displays multiple obstacle marks on the field image based on multiple pieces of the obstacle data in the storage unit, and the obstacle mark representing an older piece of obstacle data is changed from the obstacle mark representing a less older piece of obstacle data for the ease of distinction in the field image. In other words, the shape of the obstacle mark is changed for time difference between respective data acquisition times of the multiple pieces of obstacle data.

In this manner, the movement of the detected obstacle can be distinctively displayed in the captured image by the multiple obstacle marks superposed in the obstacle image. That is, the obstacle marks representing the moving direction of the obstacle enable the user to easily and intuitively understand the movement of the obstacle relative to the subject vehicle, when the obstacle is detected in the near field of the vehicle.

Further, when the obstacle detection is performed by using an electro-magnetic wave or a sound wave, the size of the obstacle mark in the captured image is controlled to be in proportion to the magnitude of a reflection wave from the obstacle.

The magnitude of reflection wave from the obstacle is basically in proportion to the size and distance of the obstacle. Therefore, by using the above operation scheme, the obstacle size can be represented in the captured image as the size of the obstacle mark, thereby enabling the user to easily distinguish the obstacle size.

In other words, both of the movement direction of the obstacle and the size of the obstacle can be intuitively notified by the arrangement of the obstacle marks. Therefore, the user can easily understand, for example, how close the vehicle currently is to the obstacle by viewing the captured image.

DETAILED DESCRIPTION

Figure 1:
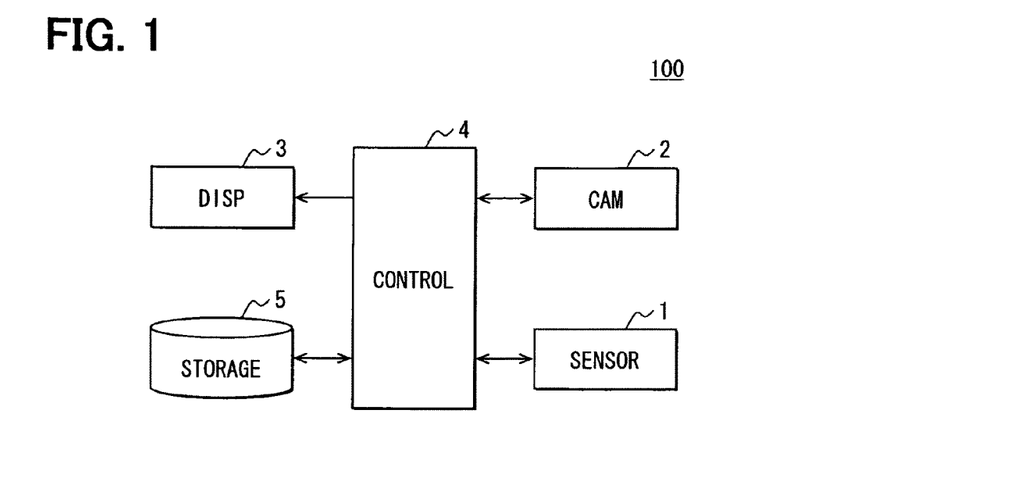
FIG. 1 is a block diagram showing a schematic configuration of a field watch apparatus in an embodiment of the present invention.

An embodiment of the present invention is explained with reference to the drawings. FIG. 1 is a block diagram showing a total configuration of a field watch apparatus 100 to which the present invention is applied. The field watch apparatus 100 shown in FIG. 1 is installed in a vehicle, and includes an obstacle sensor 1, a camera 2, a display 3, a control unit 4 and a storage device 5. These components are inter-connected by a vehicle LAN that uses a communication protocol such as CAN (Controller Area Network) or the like. In the following, a vehicle carrying the field watch apparatus 100 is called as an own vehicle.

The obstacle sensor 1 detects an obstacle around the vehicle, or more specifically, an obstacle in the rear of the vehicle. Therefore, the obstacle sensor 1 functions as an obstacle detector mentioned later in the claims. For example, the obstacle sensor 1 is installed in the rear bumper of the vehicle, for detecting an obstacle in the rear field of the vehicle.

Figure 2:
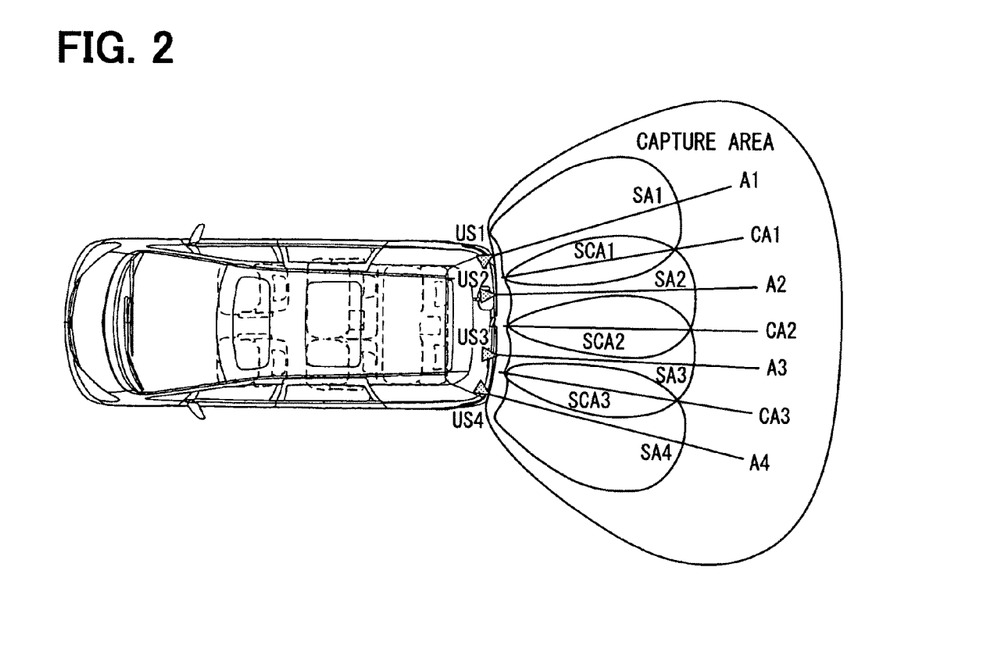
FIG. 2 is an illustration of sensor arrangement and camera capture area in the embodiment of the present invention.

In the present embodiment, four pieces of ultrasound wave sensors are implemented as the obstacle sensor 1. That is, the ultrasound wave sensors US1 to US4 are installed in the vehicle rear as shown in FIG. 2s. The ultrasound wave sensors US1 to US4 transmit an ultrasound wave, and receive the reflection wave for detecting a distance to an obstacle. In addition, the ultrasound wave sensors US1 to US4 output, to the control unit 4, information of the alternate pulse signal of transmitted ultrasound wave, which is designated as transmitted pulse signal, and information of the alternate pulse signal of received reflection wave, which is designated as received pulse signal. For example, each of the ultrasound wave sensors US1 to US4 transmits the ultrasound wave in turn at a regular interval of, for example, 50 milliseconds, which sets a wave transmission cycle starting from the sensor US1, then sensor US2, then sensor US3, to sensor US4, before returning to US1, under control of the control unit 4. In the following description, the wave transmission cycle from the sensor US1 to the sensor US4 is designated as one set of wave transmission cycle.

The camera 2 is installed in the rear of the vehicle, and captures a field in the rear of the vehicle. Therefore, the camera 2 functions as an image capture unit mentioned later in claims. In addition, the camera 2 outputs image data around a rear part of the vehicle to the control unit 4. Further, the camera 2 is installed to capture each of four detection areas of the ultrasound wave sensors US1 to US4 in its image capture range.

The display 3 displays a captured image based on an image captured by camera 2. Therefore, the display 3 functions as a display unit mentioned later in claims. In addition, the display 3 displays a superposed image to be mentioned later in detail. Further, a display screen of a car navigation apparatus may be employed as the display 3.

The control unit 4 may be provided in a form of a microcomputer having a CPU, a ROM, a RAM, a backup RAM (no denotation in the drawing), and may carry out various processes by executing various control programs memorized in the ROM. The control unit 4 determines a position of the obstacle and a distance to the obstacle, based on the information of the transmitted pulse signal and the information of the received pulse signal output from the ultrasound wave sensors US1 to US4. The distance to the obstacle is calculated based on the time between the transmission and reception of the pulse signal. The position of the obstacle is determined based on which one of the four sensors transmitted the pulse signal of the ultrasound wave and which one of the four sensors received the signal. In this case, the position of the obstacle is put on one of four detection area axes of four sensors US1 to US4. Therefore, the information of the detection area axis serves as the information of the position of the obstacle.

A relation between a detection area axis and determination of the position of the obstacle is calculated as follows. The detection area axis is an axis that is established virtually to show a rough existence position of the obstacle in the captured image. In the present embodiment, a center line of the directivity of each of the four ultrasound wave sensors and a center line of two overlapping detection areas of adjacent sensors are used as the detection area axis. The center line is, in this case, defined as both of the horizontal and vertical center of the sensor detection area.

More practically, the detection area axis is defined as illustrated in FIG. 2. That is, a detection area axis A1 is defined as a center line of a detection area SA1 of the sensor US1, a detection area axis A2 is defined as a center line of a detection area SA2 of the sensor US2, a detection area axis A3 is defined as a, center line of a detection area SA3 of the sensor US3, and a detection area axis A4 is defined as a center line of a detection area SA4 of the sensor US4. Further, a detection area axis CA1 is defined as a center line of an overlap of two adjacent detection areas SA1 and SA2, which is denoted as an area SCA1, of two sensors US1 and US2. Likewise, a detection area axis CA2 is defined as a center line of an overlap of two adjacent detection areas SA2 and SA3, which is denoted as an area SCA2, of two sensors US2 and US3, and a detection area axis CA3 is defined as a center line of an overlap of two adjacent detection areas SA3 and SA4, which is denoted as an area SCA3, of two sensors US3 and US4. In this case, the detection areas SA1 to SA4 respectively correspond to the directivity of four sensors US1 to US4.

The determination of the position of the obstacle is performed in the following manner. That is, when the ultrasound wave is transmitted from the ultrasound wave sensor US1 and the reflection wave is received by the ultrasound wave sensor US1 with the magnitude of the reflection wave exceeding a threshold, the detection area axis A1 is determined as a selected axis. Further, when the ultrasound wave is transmitted from the ultrasound wave sensor US1 and the reflection wave is received by the ultrasound wave sensor US2 with the magnitude of the reflection wave exceeding a threshold, the detection area axis CA1 is determined as a selected axis, and, when the ultrasound wave is transmitted from the ultrasound wave sensor US2 and the reflection wave is received by the ultrasound wave sensor US1 with the magnitude of the reflection wave exceeding a threshold, it is also determined that the detection area axis CA1 is a selected axis.

Likewise, when the ultrasound wave is transmitted from the ultrasound wave sensor US2 and the reflection wave is received by the ultrasound wave sensor US2 with the magnitude of the reflection wave exceeding a threshold, the detection area axis A2 is determined as a selected axis. Further, when the ultrasound wave is transmitted from the ultrasound wave sensor US2 and the reflection wave is received by the ultrasound wave sensor US3, or vice versa, with the magnitude of the reflection wave exceeding a threshold, the detection area axis CA2 is determined as a selected axis.

Further, the position detection by the sensors US3 and US4 is performed in the same manner as the position detection by the sensor US1, and the relation between the two adjacent sensors illustrated by the sensors US1 and US2 is applied to a US2 to US3 relation and a US3 to US4 relation.

That is, when the ultrasound wave is transmitted from the ultrasound wave sensor US3 and the reflection wave is received by the ultrasound wave sensor US3 with the magnitude of the reflection wave exceeding a threshold, the detection area axis A3 is determined as a selected axis. Further, when the ultrasound wave is transmitted from the ultrasound wave sensor US3 and the reflection wave is received by the ultrasound wave sensor US4, or vice versa, with the magnitude of the reflection wave exceeding a threshold, the detection area axis CA3 is determined as a selected axis.

Further, when the ultrasound wave is transmitted from the ultrasound wave sensor US4 and the reflection wave is received by the ultrasound wave sensor US4 with the magnitude of the reflection wave exceeding a threshold, the detection area axis A4 is determined as a selected axis.

The magnitude of the reflection wave may be determined as a peak height of the received pulse wave, or may be determined as a width at a certain height around the peak. In the following description, the peak height of the wave is used as the reflection wave magnitude. Further, the threshold described above is used to filter a noise, that is, to pick up the reflection wave caused only by the obstacle. The threshold may have a value that is arbitrarily determined according to the environment. More practically, when the transmission and reception of the wave are performed by the same sensor, the threshold value may be set (a) to detect the obstacle around the sensor axis, that is, to detect the obstacle at the center of the detection area of the relevant sensor, and (b) not to detect the obstacle around the center axis of overlapping detection areas of two adjacent sensors. Alternatively, when the ultrasound wave is transmitted from one sensor and is received by an adjacent sensor, the threshold value may be set (a) to detect the obstacle around the center axis of the overlapping detection areas of two adjacent sensors, and (b) not to detect the obstacle around the axis of each of the two adjacent sensors.

The process to detect an obstacle is described in the following. That is, an obstacle detection process is explained with reference to a flow in FIG. 3. The process is conducted under control of the control unit 4. The process detects the obstacle either by using a single sensor that sends and receives the ultrasound wave and its reflection wave, or by using two sensors, one of which sends the wave and the other receives the reflection. In other words, for each of the four sensors and for each of the combination of two sensors, the above-described sensing process is applied according to the flow in FIG. 3.

Figure 3:
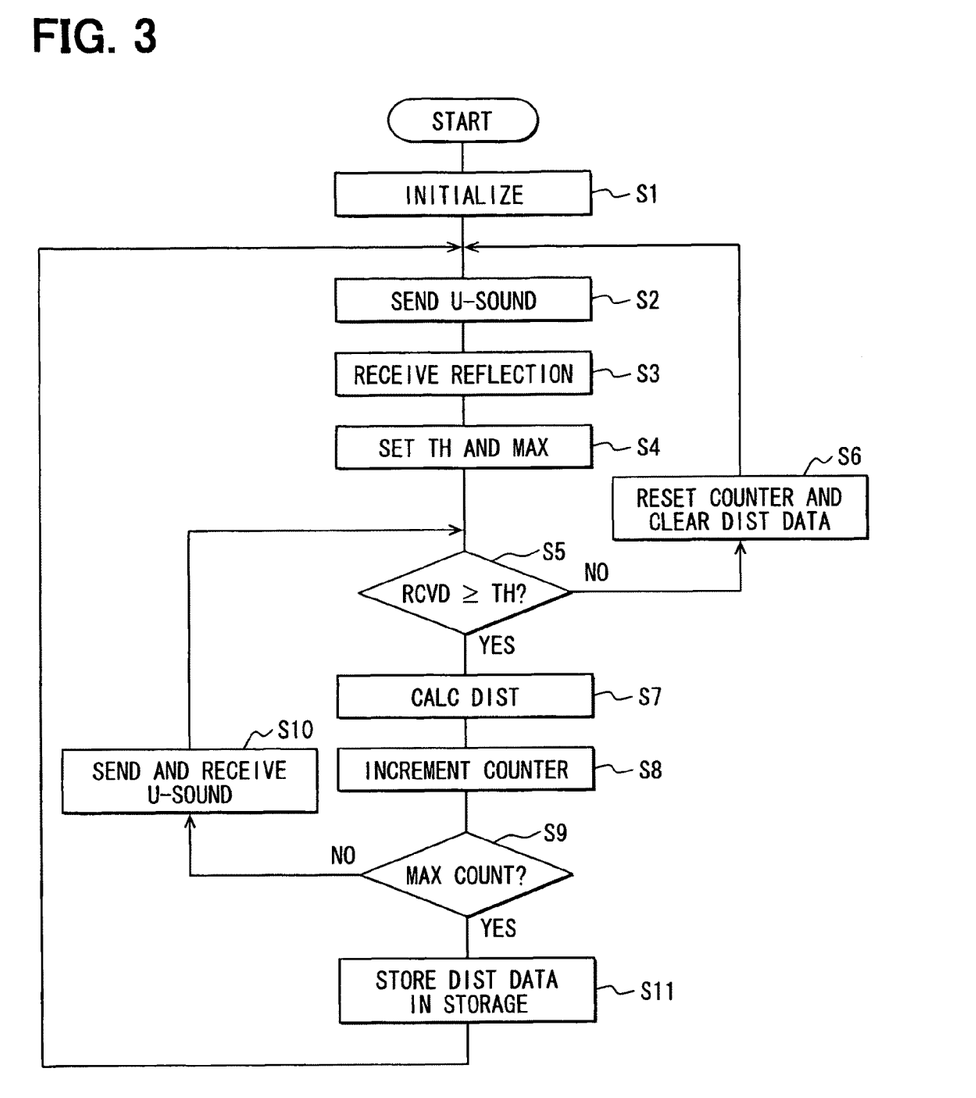
FIG. 3 is a flow diagram showing an obstacle detection process by a control unit in the embodiment of the present invention.

The flow of the process starts at, for example, a gear shift into Reverse ("R") position, which is detected by a gear shift sensor or the like.

Then, in step S1, the process performs an initialization, and proceeds to step S2. In step S2, wave transmission from the ultrasound sensor is performed by the sensor. The transmission of the ultrasound wave from each of the ultrasound wave sensors US1 to US4 has a regular interval so that the wave from different sensors does not overlap with each other.

Then, in step S3, the reflection wave of the ultrasound wave transmitted by the ultrasound wave sensor is received. In this case, the wave transmitted by the sensor US1 may is received by either of the sensor US1 or US2. Therefore, the flow in FIG. 3 is applied for both cases, that is, reception of the wave by the sensor US1, and by the sensor US2.

Then, in step S4, threshold setting and max count setting of the counter are performed. The threshold in this case is the value described above for the signal noise distinction. Therefore, in step S4, the threshold value may be respectively different for the wave reception by the same sensor and the wave reception by the different sensor. Thus, the threshold values of sensors US1 to US4 may respectively different from each other. The counter counts the number of repetition of the above determination, that is, the wave transmission, the wave reception, and signal intensity comparison relative to the threshold (described later). The max count of the counter is set to limit the repeating number of the determination for the required accuracy. That is, by repeating the above determination at least for the number of times of the max count, the received pulse signal can securely determined as the reflection wave from the obstacle. The number of the max count may, for example, be set to 3.

Then, in step S5, the peak height of the received pulse signal is determined to be exceeding the threshold. If it is determined as exceeding the threshold (step S5, Yes), the process proceeds to step S7. If not (step S5, No), the process proceeds to step S6.

Then, in step S6, the max count as well as the counted value of the counter is cleared, and "void" data is stored in the storage device 5 as distance data that represents the distance to the obstacle. Then, the flow returns to step S2 for repeating the process.

Then, in step S7, based on information of the transmitted wave and the received wave, the distance to the obstacle is calculated.

Then, in step S8, the counted value of the counter is incremented by one, to proceed to step S9.

Then, in step S9, whether or not the counted value of the counter has reached the max count is determined. If it is determined as max count (step S9, Yes), the process proceeds to step S11. If not (step S9, No), the process proceeds to S10.

Then, in step S10, the transmission and reception of the ultrasound wave are performed again before returning to step S5, to repeat the following process.

In step S11, the distance data is stored in the storage device 5, and the process returns to step S2. The distance data is stored for each of the detection area axes. For example, the distance data for the wave transmission and reception by the same sensor US1 is associated with information of the detection area axis A1 in the storage device 5. Alternatively, the distance data for the wave transmission by the sensor US1 and the wave reception by the sensor US2 is associated with information of the detection area axis CA1 in the storage device 5. That is, in other words, once the obstacle is detected by the sensor, the distance data of the detected obstacle is continually acquired over a certain time period, and is stored in the storage device 5 together with the detection area axis information. Therefore, the control unit 4 functions as data acquisition unit mentioned later in the claims.

The distance data is stored in the storage device 5 every time the above-mentioned set of wave transmission cycle is executed. If an obstacle is detected in the present set of cycle, the distance data and the detection area axis information are stored. If no obstacle is detected in the cycle, information indicative of non-existence of data is, for example, stored.

In the above description, the threshold and max count setting in step S4 is performed after step S3 where the reflection wave is received. However, the threshold and max count setting may be performed prior to the reception of the reflection wave, or may be performed at the same time of initialization in step S1. Further, the threshold and max count setting may take the noise condition into account.

This flow of FIG. 3 is concluded when the gear is shifted to a different position from the reverse position (R), which is detected by the gear shift sensor or the like.

The storage device 5 stores detection data (i.e., the distance data of the obstacle and the information of the detection area axis) acquired by the control unit 4 continually over time in an electrically re-writable memory area in a cumulative manner. Therefore, the storage device 5 functions as a storage unit mentioned later in the claims. In addition, the detection data is accumulated for the past several cycles of detection process in the storage device 5, and the oldest detection data is erased for the storage of the new detection data.

Figure 4:
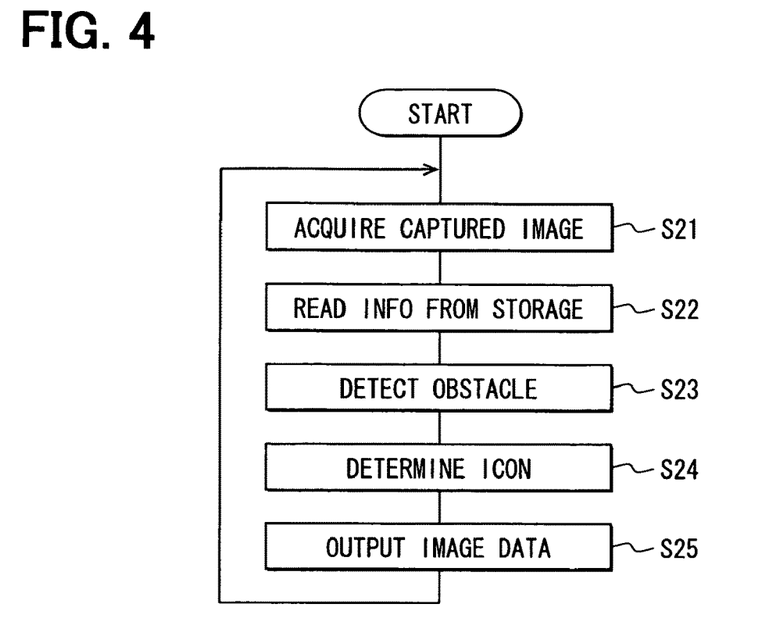
FIG. 4 is a flow diagram showing a flow of a superposing process by the control unit in the embodiment of the present invention.

When the obstacle is detected, the control unit 4 performs a superposing display process. The flow of the process is illustrated in FIG. 4. The process is started when, for example, a gear is shifted to Reverse ("R") position, which is detected by the gear shift sensor or the like.

In step S21, data of the captured image at the moment is acquired from the camera 2.

Then, in step S22, information for the past several cycles is retrieved from the storage device 5. In the present embodiment, the information for five detection cycles is retrieved. More practically, for the seven detection area axes of A1 to A4 and CA1 to CA3, the information for five detection cycles is retrieved.

Then, based on retrieved information for the past five cycles, the movement of the obstacle relative to the own vehicle (designated as an "obstacle condition" in the following) is determined in step S23. More specifically, if the latest information in the storage device 5 is about the distance to the obstacle and the detection area axis, whether the obstacle is getting closer, getting farther, or stopping is determined based on the retrieved information of the distance to the obstacle over time. If the information of non-existence of data is stored for the past five cycles in the storage device 5, the obstacle condition is not determined.

Then, in step S24, a parking process is performed. In the marking process, a mark to be displayed in a superposing manner on those seven axes of A1 to A4 and CA1 to CA3 is determined based on the information regarding the obstacle condition from the past five cycles. The marked axis determined based on the detection area axis information retrieved from the storage unit 5. Further, the marks respectively representing each of the past five cycles of detection are arranged on the selected axis according to the detected distance of the distance data. Furthermore, the color of the marks is determined either as red, blue, or yellow or the like, depending on the obstacle condition. That is, if the obstacle is getting nearer to the own vehicle, the mark may be presented in red, or in a "danger" color. If the obstacle is getting farther from the own vehicle, the mark may be presented in blue, or in a "safe" color. If the obstacle is not moving relative to the own vehicle, the mark may be presented in yellow, or in a "neutral" color. In addition, the size of the mark is changed in proportion to the "oldness" of the distance data. That is, the older the distance data (i.e., the detection data) is, the smaller the size of the mark becomes. Further, the transparency of the mark is also changed in proportion to the "oldness" of the data. That is, the older the distance data (i.e., the detection data) is, the more transparent the mark becomes. When the latest information indicates "void" data for a certain detection area axis, the mark for that detection area axis is not displayed.

Then, in step S25, the mark processed in step S24 is superposed on the captured image, and the data of the "superposed" image is output to the display 3. The process then returns to step S21 to repeat the flow. The superposing of the mark is performed in a well-known conventional manner. The display 3 then displays the superposed image according to the data.

This flow of FIG. 4 is concluded when the gear is shifted to a different position from the reverse position (R), which is detected by the gear shift sensor or the like.

In summary, the control unit 4 controls how the mark is displayed according to the detection data based on the multiple records of data. That is, the "oldness" or "newness" of the data is represented in the superposed image, by changing sizes, positions and the like, so that the distinction of the "oldness" of the data is apparent in the image. Therefore, the control unit 4 functions as a change unit mentioned later in the claims.

Figure 5:
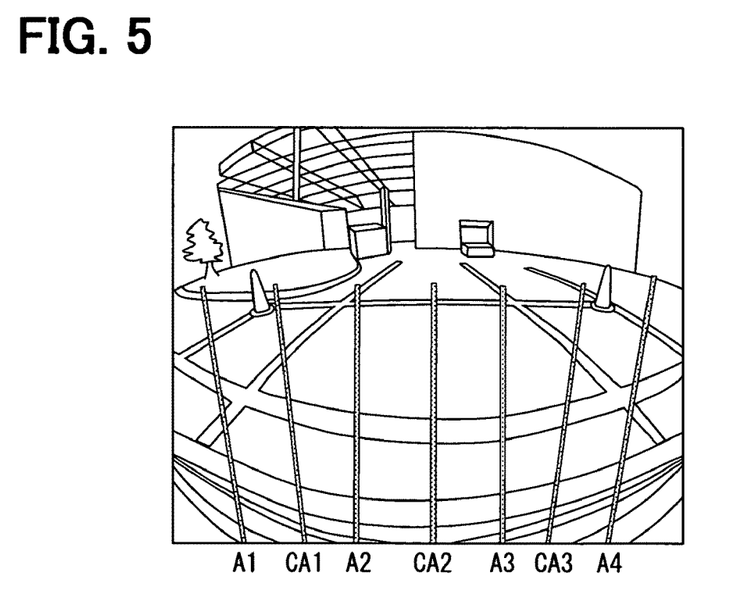
FIG. 5 is an illustration of detection area axes shown in the captured image in the embodiment of the present invention.

With reference to FIG. 5 to FIG. 7C, the above-mentioned superposed image is described. The superposed image is displayed on the display 3 in the following manner. That is, FIG. 5 is an illustration of the detection area axes of A1 to A4 and CA1 to CA3 virtually superposed on the captured image, and FIGS. 6A to 7C are illustrations of the marks superposed in the captured image. In the present embodiment, the marks in the image have an oval shape.

The marks in the image are positioned along the axes A1 to A4 and CA1 to CA3 as shown in FIG. 5. The lines representing those seven axes in FIG. 5 are drawn for explanation purposes, and are not displayed in the superposed image in the present embodiment. The axes may be displayed in the superposed image.

Figure 6A:
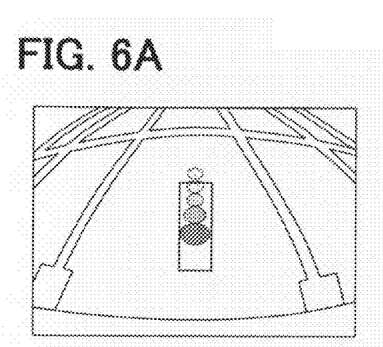
FIGS. 6A to 6C are illustrations of superposed images that have marks in the captured image in the embodiment of the present invention.
Figure 6B:
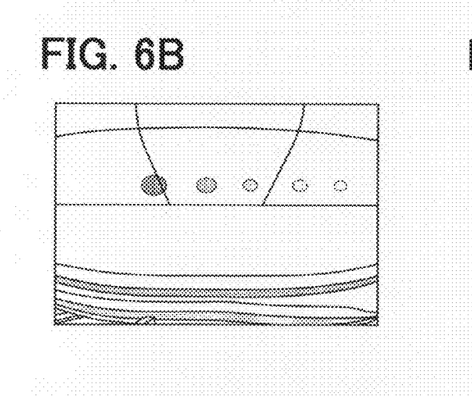
Figure 6C:
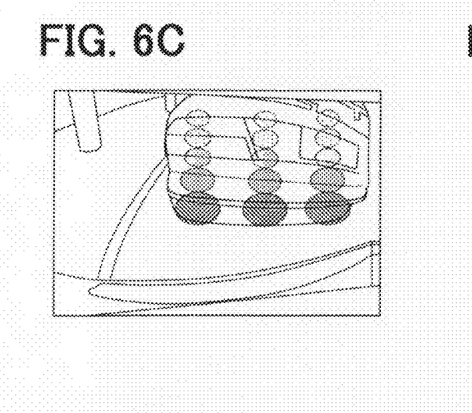

In case that the obstacle is getting nearer to the own vehicle, the marks in the image become bigger and less transparent on the own vehicle side as shown in FIG. 6A. Further, when the obstacle is moving sideways relative to the own vehicle, the moving direction of the obstacle is indicated by the bigger and less transparent marks as shown in FIG. 6B. The viewpoint of the superposed image may be the one in FIG. 6A, which is the same viewpoint as the captured image, or may be the one in FIG. 6B, which is a vertically-looking down view from above after a viewpoint conversion. If the obstacle is detected in the directions of more than one detection area axis, the marks are displayed in the manner as shown in FIG. 6C. The viewpoint of the image in FIG. 6C is the same viewpoint of the captured image. The obstacle detection in the multi detection areas are described in more detail as the explanation of FIGS. 7A to 7C in the following.

Figure 7A:
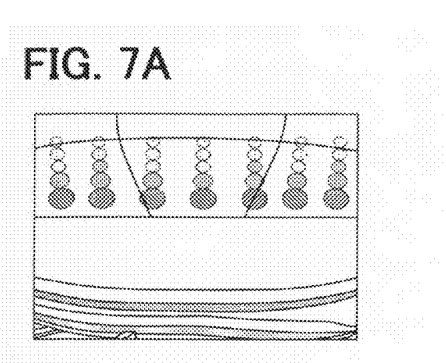
FIG. 7A to 7C are other illustrations of superposed images that have marks in the captured image in the embodiment of the present invention.
Figure 7B:
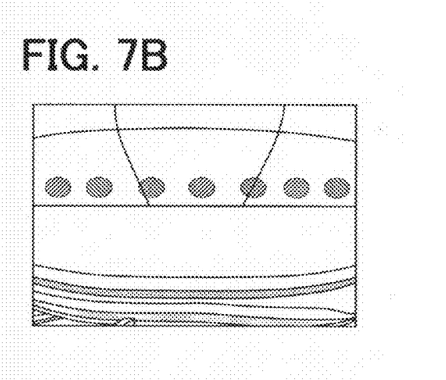
Figure 7C:
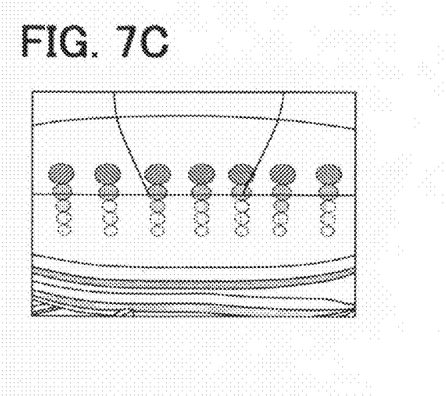

Further, when the obstacle is a wide object such as a wall or the like, the marks are arranged along a couple of axes of multiple detection areas, as shown in FIG. 7A to FIG. 7C. In this case, FIG. 7A is an illustrative example of the superposed image when the own vehicle is getting closer to the wall, and FIG. 7B is an illustrative example of the superposed image when the own vehicle is stopping in front of the wall, and FIG. 7C is an illustrative example of the superposed image when the own vehicle is getting farther away from the wall. In addition, the superposed images shown in FIG. 7A to FIG. 7C are bird's eye views.

The operation scheme of the field watch apparatus of the present invention is now summarized as follows. That is, by the changing sizes and transparency of the marks in the superposed image, the respective marks are distinguished, in terms of which mark is older than the other, in a self-explanatory manner, based on the detection data of the obstacle that is detected by the obstacle sensor 1 (i.e., the ultrasound wave sensors US1 to US4). The above distinction of the "oldness" of the obstacle marks thus enables the viewer to recognize how the obstacle is moving relative to the own vehicle, as the vehicle moves, or, in other words, as the obstacle in the image moves over time. That is, when the obstacle is getting closer to the vehicle, the marks on the vehicle side in the captured image are displayed in a larger size, to good effect of representing that the obstacle is approaching to the vehicle. Alternatively, when the obstacle is moving away from the vehicle, the marks on the vehicle side in the captured image is displayed in a smaller size, to good effect of representing that the obstacle is departing from the vehicle. By the change of the transparency of the marks in the image, the above effect of approaching and departing can be strengthened. Therefore, the direction of the obstacle movement is visually represented by those marks changing in size and other attributes. As a result, the viewer can intuitively understand which way the obstacle is moving relative to the own vehicle as well as obtaining a feel of how large the actual size of the obstacle is.

Further, according to the above-mentioned operation scheme, the marks are displayed along one axis or multiple axes according to the detected distance of the obstacle, based on the reflection of the ultrasound wave received by the respective sensors US1 to US4. In addition, the position of those detection area axes in the image is stable and fixed, once the sensors and the camera 2 are fixedly installed on the vehicle. Therefore, the display area of the marks may be limited to a certain portion of the captured image without compromising the above-described advantageous effects of intuitively representing the movement direction of the obstacle as well as the size of the obstacle. In addition, the display used in the vehicle usually has a smaller size such as 6.5 inches to 8 inches or the like, thereby allowing the above-described limitation of the mark display area to a certain portion in the image without having a trouble such as the display of the marks and the captured obstacle in the image being too distant from each other. As a result, the process load of the present operation scheme is reduced relative to a process that calculates an accurate position of the obstacle based on the captured image and displays the marks accurately at the calculated positions. In other words, the advantageous effects of intuitively displaying the obstacle movement can be achieved by the reduced amount of processing.

Although the present disclosure has been fully described in connection with preferred embodiment thereof with reference to the accompanying drawings, it is to be noted that various changes and modifications will become apparent to those skilled in the art.

For example, reception level of the reflection wave may be calculated. That is, between steps S4 and S5 in FIG. 3, or as step S5 shown in FIG. 8, the peak height of the received pulse signal that is received in step S3 in FIG. 8 may be calculated. The reception level of the signal may be determined at a certain height of the pulse signal. This level calculation may be performed prior to step S4 in FIG. 8.

Figure 8:
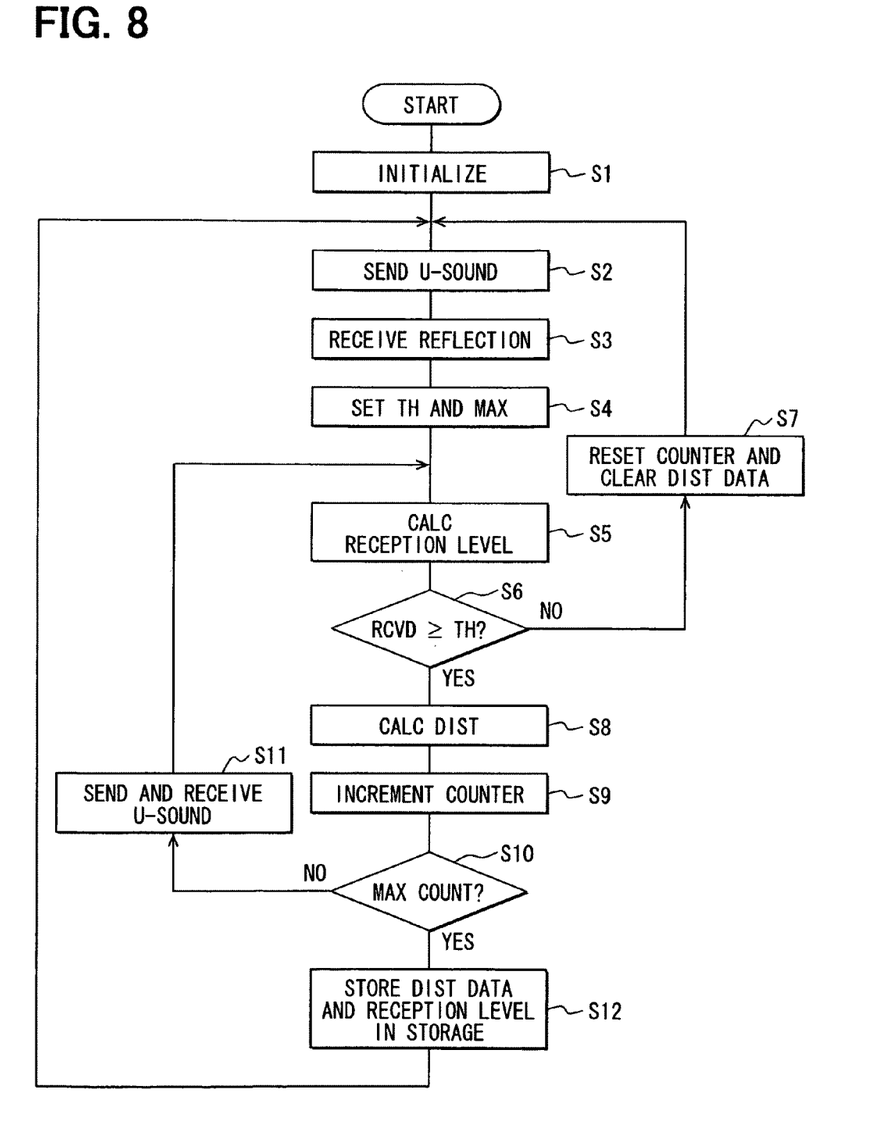
FIG. 8 is a flow diagram of a modified flow of the obstacle detection process by the control unit in the embodiment of the present invention.

Then, the reception level may be stored in the storage device 5 in step S12 in FIG. 8 together with the distance data. The association of the reception level with the detection area axis may be performed in the same manner as the association of the distance data.

Further, the reception level may be used to change the mark size. That is, for example, higher reception level may be represented by the larger mark size in the image. The size table to determine the mark size according to the reception level may be employed for the display of the mark in the image. The mark size may be controlled so that the marks at two adjacent positions do not overlap with each other.

Furthermore, the mark size may be determined by combining two or more factors. That is, for example, the reception level and the "oldness" of the detection data may be combined to determine the mark size in the image. The transparency may also be employed for representing the "oldness" of the data.

When the obstacle reflects the electro-magnetic wave or the sound wave, the magnitude of the reflection wave from the obstacle is basically in proportion to the size and the distance of the obstacle. Therefore, the obstacle marks sized to be proportional to the reception level of the reflection wave (e.g., the magnitude of the wave, or the signal intensity of the reflection wave) can accurately represent the size of the obstacle in the near field of the vehicle. In other words, when the obstacle is marked in the captured image in the above-described manner, the user can easily recognize the size of the obstacle based on the novel arrangement of the obstacle marks in the present embodiment.

Further, though the older marks are made smaller and more transparent in the present embodiment, a different mark display scheme may be employed. That is, for example, only the size change or transparency change may be used to represent the older marks in the superposed image, for the purpose of the obstacle movement direction.

Further, the color change (i.e. at least one of hue, saturation, and brightness of the mark) may be employed to represent the obstacle movement. More practically, the closer mark relative to the own vehicle may have the hue of the more "dangerous" color, or higher saturation intensity, or brighter color. Alternatively, the farther marks may have the "safer" color, or lower saturation intensity, or less brighter color and the like. Furthermore, the color as well as other factors of size and transparency may be combined to represent the obstacle movement.

Further, determination of the obstacle condition determined by the control unit 4 may be omitted, and color change of the mark, such as the hue change, for representing the relative movement of the obstacle may not be used.

Further, mark shape may be arbitrarily changed. That is, not only the oval shape but also other shapes such as a round shape, a rectangular shape, a star shape, a polygonal shape or the like may be used.

Further, the number of the ultrasound sensors may be different from four that is used in the present embodiment. The number of the sensors may be greater than four, or smaller than four.

Further, the camera 2 may be installed to capture a front image of the own vehicle, and the obstacle sensor 1 may be installed to detect an obstacle in the front field of the vehicle. Alternatively, the camera 2 may be used to capture a surrounding field image and/or a side field image of the own vehicle, and the obstacle sensor 1 may be used to detect an obstacle in the surrounding field and/or side field of the own vehicle. Furthermore, the front and side field image and the rear field image may be combined to generate the superposed image.

Further, the ultrasound wave sonar used as the obstacle sensor 1 in the present embodiment may be replaced with other sensors, such as a millimeter wave radar, a laser radar or the like. Furthermore, the image recognition technique to recognize the obstacle in the captured image may be used as the obstacle sensor 1.

Such changes, modifications, and summarized operation schemes are to be understood as being within the scope of the present disclosure as defined by appended claims.

What is claimed is:

1. A field watch apparatus comprising:
    an image capture unit capturing a field image around a vehicle;
    an obstacle detector detecting an obstacle around the vehicle;
    a display unit displaying the field image captured by the image capture unit, wherein the field image has an obstacle mark superposed thereon when the obstacle is detected by the obstacle detector;
    a data acquisition unit continually acquiring obstacle data from the obstacle detector after an initial detection of the obstacle;
    a storage unit accumulating the obstacle data continually acquired by the data acquisition unit; and
    a change unit changing the obstacle mark in association with the obstacle data, wherein
    the change unit displays multiple obstacle marks on the field image based on multiple pieces of the obstacle data in the storage unit, and
    an obstacle mark representing an older piece of obstacle data is changed from an obstacle mark representing a less older piece of obstacle data for the ease of distinction in the field image.

2. The field watch apparatus of claim 1, wherein
the obstacle data includes information on a position and a distance to the obstacle that is detected by the obstacle detector.

3. The field watch apparatus of claim 1, wherein
the obstacle mark representing the older piece of obstacle data is made smaller.

4. The field watch apparatus of claim 1, wherein
the obstacle mark representing the older piece of obstacle data is made more transparent.

5. The field watch apparatus of claim 1, wherein
at least one of hue, saturation, and brightness of each of the obstacle marks is changed for the distinction of respective pieces of obstacle data.

6. The field watch apparatus of claim 2, wherein
the obstacle detector is made up from multiple distance sensors having respectively different detection areas,
the change unit controls the display of the multiple obstacle marks to be aligned along a detection axis of the respective distance sensors according to the detected distance of the obstacle, and
the display of each of the obstacle marks is determined respectively for each of the detection axes of the multiple distance sensors based on the detection of each of the obstacles by a respective sensor.

7. The field watch apparatus of claim 6, wherein
the change unit uses additional detection axes that define a center line of two detection axes of adjacent distance sensors for the display of each of the obstacle marks according to the detected distance of the obstacle.

8. A field watch apparatus comprising:
an image capture unit capturing a field image around a vehicle;
an obstacle sensor detecting an obstacle around the vehicle by using reflection of one of an electro-magnetic wave and a sound wave;
a display unit displaying the field image captured by the image capture unit, wherein the field image has an obstacle mark superposed thereon when the obstacle is detected by the obstacle sensor; and
a change unit changing the obstacle mark according to a magnitude of the reflection wave detected by the obstacle sensor; wherein
a size of the obstacle mark is made to be in proportion to the magnitude of the reflection wave detected by the obstacle sensor that has detected the obstacle.

9. The field watch apparatus of claim 8 further comprising:
a data acquisition unit continually acquiring obstacle data from the obstacle sensor after an initial detection of the obstacle; and
a storage unit accumulating the obstacle data continually acquired by the data acquisition unit, wherein
the change unit displays multiple obstacle marks on the field image based on multiple pieces of the obstacle data in the storage unit,
the obstacle mark representing an older piece of obstacle data is changed from the obstacle mark representing a less older piece of obstacle data for the ease of distinction in the field image.

10. The field watch apparatus of claim 9, wherein
the obstacle data includes information on the magnitude of the reflection wave as well as a position and a distance to the obstacle that is detected by the obstacle sensor.

11. The field watch apparatus of claim 8, wherein
the obstacle mark is made smaller for an older piece of obstacle data.

12. The field watch apparatus of claim 8, wherein
the obstacle mark is made more transparent for an older piece of obstacle data.

13. The field watch apparatus of claim 8, wherein
at least one of hue, saturation, and brightness of the obstacle mark is changed for the distinction of respective pieces of obstacle data.

14. The field watch apparatus of claim 10, wherein
the obstacle sensor is made up from multiple distance sensors having respectively different detection areas,
the change unit controls the display of the multiple obstacle marks to be aligned along a detection axis of the respective distance sensors according to the detected distance of the obstacle, and
the display of each of the obstacle marks is determined respectively for each of the detection axes of the multiple distance sensors based on the detection of each of the obstacles by a respective sensor.

15. The field watch apparatus of claim 14, wherein
the change unit uses additional detection axes that define a center line of two detection axes of adjacent distance sensors for the display of each of the obstacle marks according to the detected distance of the obstacle.

* * * * *